United States Patent [19]
Hoff et al.

[11] 3,831,239
[45] Aug. 27, 1974

[54] APPARATUS FOR BENDING GLASS

[75] Inventors: Karl Heinz Hoff, Uebach-Palenberg; Peter Küpper, Alsdorf; Joseph Meyer, Stolberg; Werner Pagel, Merkstein; Heinz Schmitt, Aachen, all of Germany; Maurice Nedelec, Versailles, France

[73] Assignee: Saint-Gobain Industries, Neuilly-sur-Seine, France

[22] Filed: June 22, 1973

[21] Appl. No.: 372,627

[30] Foreign Application Priority Data
June 23, 1972   France.......................... 72.22800

[52] U.S. Cl............................ 29/125, 26/63, 65/106
[51] Int. Cl............................................ B21b 31/08
[58] Field of Search........... 29/125, 116 R, 116 AD, 29/121 R, 121 A; 65/106, 107; 26/63

[56]           References Cited
           UNITED STATES PATENTS
2,771,658   11/1956   Morrill.......................... 29/116 R X
3,099,072   7/1963   Robertson et al. ..................... 26/63
3,213,513   10/1965   Robertson..................... 29/116 R X
3,545,951   12/1970   Nedelec.......................... 65/107 X

*Primary Examiner*—Alfred R. Guest
*Attorney, Agent, or Firm*—Pennie & Edmonds

[57]                ABSTRACT

In glass bending apparatus employing an array of curved rods to define a cylindrical surface over which glass sheets heated to plasticity are traversed in order to conform them to that surface, the invention provides a roller construction which includes for each roller a corrugated tube engaged over a curved rod and caused to rotate and to flex with respect to the rod by suitable driving mechanism, the tube having a plurality of bearing rings affixed inside thereof between adjacent inwardly directed corrugations of the tube and disposed radially inwardly of an outwardly extending corrugation of reduced diameter at which annular sections of the tube are assembled as by welding at a circumferential seam. At each such seam a split ring is assembled over the seam to restore the outwardly extending corrugation of the tube to full diameter.

5 Claims, 3 Drawing Figures

APPARATUS FOR BENDING GLASS

The present invention relates to apparatus for bending or shaping glass in sheet form while heated to a plastic state. Apparatus of this character is described in U.S. Pat. No. 3,545,951. The present invention provides an improvement over the apparatus described in that patent. In the apparatus of that patent, glass sheets emerging from an oven pass over an array of identical arched or curved rods which extend parallel to each other transversely of the direction of glass travel. The rods have their ends aligned together in two parallel straight lines which desirably define a horizontal plane. The rods are pivoted at their ends so that each is rotatable about an axis passing through the ends of that rod. The rods are coupled together by means of cranks and a link connecting to those cranks so as to be rotatable together. The rotation may extend from a first position in which the plane defined by the curvature of each rod lies in the plane defined by the ends of all rods to a second position in which the plane of each rod is perpendicular to the plane defined by the ends of the rods. With the rods in this second position, and in any other position between the first and second positions, the rods define together a cylindrical surface to which the plastic glass sheet is brought to conform as it passes over the rods. The cylindrical surface may be thought of, in geometrical terms, as the envelope of the rods. The term "cylindrical surface" is here used in its geometrical sense to mean a surface defined by a straight line, the generatrix, moving parallel to itself while maintaining contact with a fixed curve, the directrix. The generatrix is the line defined by the pivot points of the rods at one side of the array and the directrix is any one of the curved rods.

In the apparatus of the French patent each of the rods is enclosed in a metallic sleeve or tube having circumferential corrugations to give it transverse flexibility while retaining torsional stiffness. Each tube is affixed at one end to a toothed wheel journaled on its rod. The pinions and thereby the tubes are driven together. Each rod with its tube may thus be described as a roller or roller assembly. The rotating, flexing tubes thus provide a form of roller conveyor, whereby the glass sheets are advanced over the array. The corrugated tubes may be covered with woven glass sleeves to prevent the corrugations of the tubes from imprinting themselves on the soft glass. The glass may take on the cylindrical shape of the array by operation of gravity, or alternatively a mating concave cylindrical surface may be provided above the array, arranged to travel along with the glass sheets and to descend progressively so as to impose its shape and that of the array onto each glass sheet by the time the sheet reaches the end of the array.

The apparatus must operate at temperatures of the order of 600° C. or higher, and the corrugated tubes undergo continuous flexure as they are rotated by their pinions about their rods. The tubes are therefore desirably made of corrosion-resistant steel, and they must have sufficient elasticity and flexibility to withstand the continuous flexure which they undergo as they are rotated about the curved axes defined for them by the rods on which they are engaged. In the apparatus as heretofore constructed large forces of friction must be overcome in so driving the corrugated tubes.

In accordance with the present invention, means are provided to facilitate the rotation of the corrugated tubes about the curved rods, and an improved form of corrugated tube is provided. The invention thus provides an improved glass bending roller. More particularly, and considering a single roller, in accordance with the invention the inside diameter of the flexible tube is made larger than the diameter of its rod. A plurality of rings is disposed on the inside of the tube, each ring being located between two adjacent corrugations, and the rings being at suitable intervals along the length of the tube. These rings rotate with the tube around the rod and provide the bearing surfaces between the tube and rod. By reason of the presence of these rings the flexible tube does not come into contact with the rod, and sliding friction occurs only between the rod and the inner cylindrical surfaces of the rings. These rings will hereinafter sometimes be called bearing rings. The portions of the tube suspended between adjacent bearing rings are capable of sustaining sufficient stress from the glass sheets without collapsing onto the rod and are thus capable, in combination with the rods, of imposing the desired cylindrical shape on the glass sheets.

In a preferred embodiment of the invention the bearing rings are made of graphite. They thus have excellent self-lubricating properties even at the high temperatures above mentioned which are encountered in operation.

According to a further feature of the invention, the undulations or corrugations in the refractory metal tubes are of rectangular section, to provide a maximum surface against which the glass sheets may bear and thereby to minimize the possibility that the corrugations will imprint themselves as longitudinal grooves on the soft glass. Such a section for the corrugations is desirable even though the corrugated tubes are advantageously enclosed in woven fabric sleeves, of glass fibers for example, because with such a section the tube gives maximum support to the sleeve and thereby to the glass sheet being bent.

The bearing rings of the invention are advantageously disposed, lengthwise of the tube, between adjacent inwardly directed corrugations and bear against an outwardly directed corrugation of reduced diameter, as will hereinafter be more fully explained. To permit such placement of the bearing rings each tube is, in a preferred form of the invention, made up of a plurality of annular pieces or sections assembled to each other, as by welding, along circular seams with the bearing rings being placed before assembly of the sections at the junctions between adjacent sections.

To avoid a protrusion outside the desired maximum diameter of the tubes at these seams, as by weld metal at those seams, it is desirable that the sections be terminated axially, before assembly, at incomplete outwardly directed corrugations of reduced diameter. On the other hand, the glass sheets must for some purposes possess an optically smooth surface — for example when they are to be used for automobile windshields. Hence gaps between adjacent outwardly directed corrugations in the finished tubes are to be avoided.

In one preferred form of the invention such gaps are avoided, consistently with use of the construction thus far described, by providing at the junction between adjacent sections a supplementary ring outside the tube, effectively restoring the tube to its full outside diameter at the axial position of that ring. The supplementary rings may be made up of two substantially semi-circular halves assembled together after the sections of the tube have been fastened to each other, as by welding. These half rings are desirably provided with a circumferential groove on the inner cylindrical surface thereof, this groove fitting over the line of junction or welding of two successive sections of the tube. The half rings may additionally have formed therein a circumferential groove in the outer cylindrical surface thereof, to receive a wire or similar element to hold the two half rings together.

The two half rings may be sawn from a single complete ring and are restored to circular shape when assembled, despite loss of the thickness represented by the saw cut, by the use of shouldered spacing pins.

BRIEF DESCRIPTION OF THE DRAWINGS

The invention will now be further described in terms of a number of presently preferred exemplary embodiments and by reference to the accompanying drawings wherein.

DESCRIPTION OF PREFERRED EMBODIMENT

Figure 1:
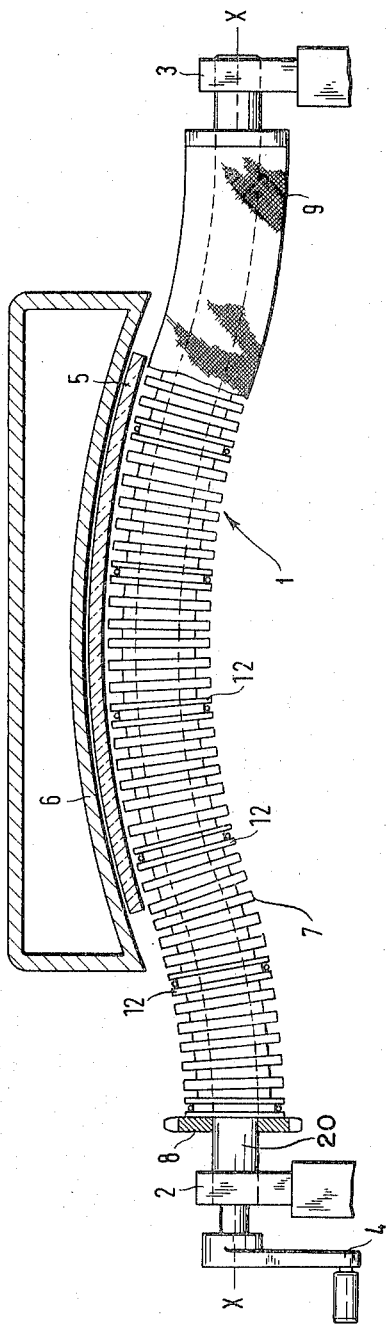
FIG. 1 is a view in elevation of a glass bending roller according to a presently preferred embodiment of the invention, shown with the fabric sleeve thereof partly cut away, and shown moreover in association with a vertical sectional view of a glass sheet undergoing bending and of the complementary concave bending form which cooperates with the roller in bending the glass sheet.

Referring to FIG. 1, the roller of the invention is generally identified by the reference character 1. It includes a curved rod 20 having parallel collinear end portions and a curved or arched central portion. The ends of the rod 20 are supported in bearings 2 and 3 for rotation about an axis X—X by means of a crank 4 affixed to the rod. A tubular member 7 is engaged over the rod 20 and desirably extends over the entire curved portion of the rod or, at any rate, over at least as much of the length of the curved portion as is engaged by the width of the glass sheet 5 to be bent. The tube 7 possesses circumferential corrugations, one of which is identified at reference character 21 in FIG. 2. At one end the tube 7 is affixed to a pinion 8 which is journaled on a straight portion of the rod 20 and which is arranged to be rotated by gearing not shown. The tube 7 is covered by a sleeve 9 of non-inflammable material, woven for example of glass fibers. As in the construction of the French patent above-identified, a complete glass bending apparatus employing rollers according to the invention includes a plurality of such rollers in the arrangement hereinabove already described with reference to that patent. With reference to FIG. 1, the other rollers of the plurality are located above and below the plane of the figure. By rotation of the cranks 4 for the rollers the plane defined for each roller by the curvature of its rod can be shifted between the position of FIG. 1 and the position in which that plane is perpendicular to the plane of the figure so as to impose on the glass sheet 5 any degree of curvature between the maximum obtainable, with the rollers orientated as in FIG. 1, and zero curvature when the rods 20 are rotated 90° from the position of the rod 20 in FIG. 1.

In FIG. 1, reference character 6 identifies a form which, as in the apparatus disclosed in the French patent, moves perpendicular to the plane of FIG. 1 with the glass sheet 5 and which moves simultaneously downward pressing the glass sheet 5 against the cylindrical surface defined by the array of rollers 1.

Figure 2:
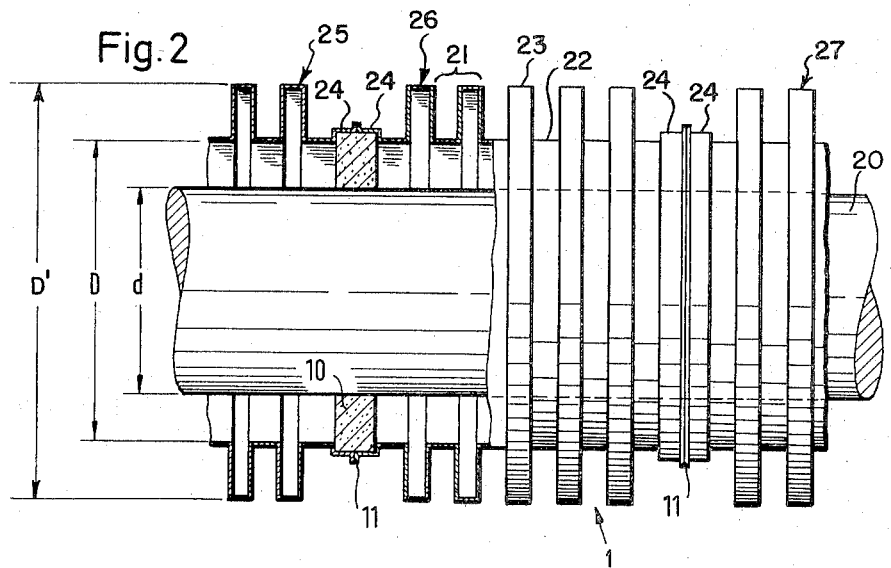
FIG. 2 is a fragmentary view, partly in axial section of the roller of FIG. 1 showing one of the bearing rings between the tube and rod of the roller but omitting the supplementary rings outside the tubular member of the roller.
Figure 3:
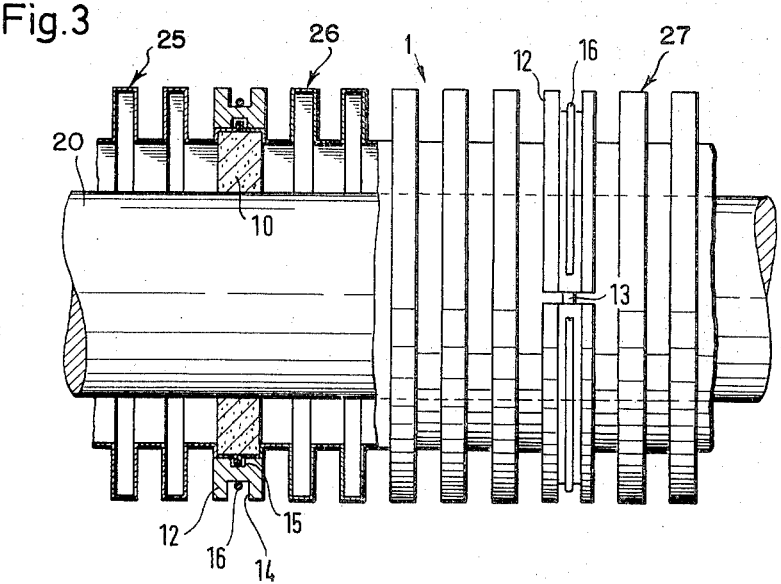
FIG. 3 is a fragmentary view similar to that of FIG. 2 but showing the supplementary rings outside the tubular member of the roller.

Referring now to FIGS. 2 and 3, the rod 20 is shown as having an outside diameter d while the flexible tubular member 7 has an inside diameter D which is substantially larger than d. The circumferential corrugations identified in FIG. 2 by the reference character 21, with cylindrical inner and outer portions 22 and 23, confer upon the tube 7 inner and outer diameters D and D', with D' larger than D and D larger than the diameter d of the rod 20. D' and D are accordingly the maximum and minimum diameters of the corrugations. It is the diameter D', slightly increased due to the thickness of the flexible woven jacket 9 (FIG. 1), which constitutes the outside diameter of the roller 1.

The corrugated tube 7 is supported from the curved rod 20 by means of a plurality of bearing rings 10 of which one is seen in section in FIGS. 2 and 3, but of which a second one is present even in the fragmentary portion of the roller shown in FIGS. 2 and 3 beneath the cylindrical portions 24 of the tube at the right of the figure. The rings 10 may be separated by intervals of the order of 30 to 60 mm. along the curvilinear length of the rod 20, and are desirably made of graphite.

The tube 7 is of heat resistant steel with a relatively thin wall thickness so as to be capable of sustaining the continuous flexure resulting from its rotation about the curved rod 20. The corrugations 21 are desirably of rectangular section as shown so as to provide by means of the cylindrical outer portions 23 thereof a maximum surface for support of the fabric jacket 9 and thereby of the glass sheet 5 (FIG. 1) being bent.

The tube 7 is made up of a plurality of annular sections, three of which are shown in FIGS. 2 and 3, where they are generally identified at reference characters 25, 26 and 27. The sections are terminated axially at cylindrical portions 24 of diameter larger than the diameter D and smaller than the diameter D'. Optionally the portions 24 may be provided at their free ends with narrow radially extending flanges, also having an outside diameter smaller than D'. Adjacent sections of the tube are fastened together, as by welding, at circumferential joints or seams 11 where the portions 24 of two such sections are joined. Before however two such sections are so welded together, a bearing ring 10 is assembled to the two sections, into the inwardly open groove provided by the two portions 24 to be joined. The bearing ring has an inner diameter substantially equal to but slightly greater than the outside diameter d of the rod 20 in order to slide thereon, and an outside diameter fitting snugly into the groove just described. The portions 24 and any flanges thereon are made of diameter smaller than D' in order that metal from the weld seam 11 will not extend out beyond the smooth cylindrical surface of the tube, of diameter D', defined by the cylindrical outer portions 23 of the corrugations.

In order however to maintain the continuity of the outer surface of the tube at the junctions between adjacent tube sections, there is provided at each such junction, as illustrated in FIG. 3, an outer ring 12. The rings 12 have the same outer diameter D' as the remainder of the tube and have an inside diameter to fit over the cylindrical portions 24. The rings 12 moreover have formed on the inner cylindrical surface thereof a groove as indicated at 15 to accommodate the weld seam 11 and any flanges on the portions 24, and they have in their outside cylindrical surface a groove 14 to accommodate a wire or other tensile member 16.

The rings 12 are preferably assembled onto the tube after adjacent tube sections have been welded together. They are therefore advantageously split along a diameter, as by sawing, and the halves are held together by means of the tensile member 16. To hold the ring halves in correct relative position, shouldered pins 13 may be provided so as to compensate for the material removed from the rings 12 when they were sawn in half. The rings 12 and tensile members 16 and pins 13 are desirably made, like the tube sections 25, 26 and 27, of refractory steel.

While the invention has been hereinabove described in terms of a presently preferred embodiment thereof, the invention is not limited thereto but rather comprehends all modifications of and departures from that embodiment properly falling within the spirit and scope of the appended claims.

We claim:

1. A glass bending roller comprising a rod having a curved portion, a tubular member engaged over said curved portion, said tubular member having a larger minimum internal diameter than the outer diameter of said portion of said rod, and a plurality of rings disposed between said rod and tubular member, said rings being engaged on said rod and being affixed to the inside of said tubular member, said tubular member being made up of a plurality of annular sections having circumferential corrugations, said sections being axially terminated at cylindrical portions of diameter between the maximum and minimum diameters of said corrugations and being fastened together at circumferential joints joining said cylindrical portions, said rings being disposed on the radially inside surface of said cylindrical portions as so joined together.

2. A roller according to claim 1 further comprising rings disposed exteriorly of said tubular member at said joints and having an outside diameter substantially equal to said maximum diameter.

3. A roller according to claim 2 wherein said last-named rings have each a circumferential groove formed in the radially inside surface thereof to accommodate said joints.

4. A roller according to claim 2 wherein said last-named rings are split along a diameter.

5. A roller according to claim 4 wherein said last-named rings have each a circumferential groove formed in the radially outside surface thereof, said roller further including for each of said last-named rings a tensile member engaged in said groove to hold the halves of the ring together.

* * * * *